United States Patent [19]

Mori

[11] Patent Number: 4,858,129
[45] Date of Patent: Aug. 15, 1989

[54] X-RAY CT APPARATUS

[75] Inventor: Issei Mori, Tochigi, Japan

[73] Assignee: Kabushiki Kaisha Toshiba, Kawasaki, Japan

[21] Appl. No.: 99,904

[22] Filed: Sep. 22, 1987

[30] Foreign Application Priority Data

Sep. 30, 1986 [JP] Japan .................... 61-229695
Sep. 30, 1986 [JP] Japan .................... 61-229703

[51] Int. Cl.⁴ ............................ G06F 15/42
[52] U.S. Cl. .................. 364/413.14; 358/111; 378/901; 382/6; 382/54
[58] Field of Search ............ 378/90, 99, 901; 358/111; 382/6, 52, 54; 364/414

[56] References Cited

U.S. PATENT DOCUMENTS

| | | | |
|---|---|---|---|
| 4,616,319 | 10/1986 | Peters et al. | 364/414 |
| 4,654,797 | 3/1987 | Fujita et al. | 364/414 |
| 4,658,412 | 4/1987 | Finkler et al. | 364/414 |
| 4,674,046 | 6/1987 | Ozeki et al. | 364/414 |
| 4,751,644 | 6/1988 | Koka et al. | 364/414 |

Primary Examiner—A. D. Pellinen
Assistant Examiner—Jeffrey A. Gaffin
Attorney, Agent, or Firm—Finnegan, Henderson, Farabow, Garrett, & Dunner

[57] ABSTRACT

An X-ray CT apparatus, in which a plurality of dynamic tomographic images obtained by repeatedly photographing a region of interest of a subject under examination are stored in an image memory, for subsequent display on a display device. A processing device extracts data of pixels along a certain line common to all of the tomographic images, and stores the pixel data in the image memory, in the order of photographing time of the tomographic images, thus forming a time sequence image formed of picked-up pixels. The processing device reduces a tomographic image and the time sequence image, and rearranges the reduced images in one frame area of the image memory for simultaneous display thereof on the display device.

7 Claims, 8 Drawing Sheets

X-RAY CT APPARATUS

BACKGROUND OF THE INVENTION

This invention relates to an X-ray computerized tomography apparatus and, more particularly, to an X-ray CT apparatus having a dynamic scanning function for repeatedly obtaining a tomographic image of a region of interest of a living subject under examination.

As a means for observing changes occurring over time in a region of interest of a subject under examination, an X-ray CT apparatus is known which has a dynamic scan function for repeatedly obtaining a tomographic image of the region in question.

The following are methods by which the dynamic scan image can be observed:

(1) Cine display: Tomographic images are displayed continuously frame by frame at a high speed.

(2) Multi-frame display: A plurality of reduced-scale tomographic images are simultaneously displayed on a screen.

(3) Time density curve display: The average value of CT values in an area of interest of a tomographic image is obtained for each of the tomographic images, and this average value is displayed in the form of a graph.

The methods of observation noted above nevertheless entail the following problems:

First, when cine display is employed, quantitative observation is difficult. In addition, it is possible that slight changes may be overlooked, since only a single image can be displayed at a time.

In the case where the multi-frame display is used, changes cannot easily be recognized without simultaneous comparative observation of adjacent tomographic images. Without an image-comparison facility, any observation carried out over an extended period will undoubtedly result is an increase in observer fatigue.

In the case where time density curve display is utilized, CT values can be recognized only for a particular area of interest, with the result that it is difficult to evaluate the overall image.

SUMMARY OF THE INVENTION

An object of the present invention is to provide an X-ray CT apparatus which permits changes over time in a portion of a dynamic scan image to be seen at a glance.

An X-ray computerized tomography apparatus according to the present invention comprises memory means for storing, in each frame area, pixel data of each of a plurality of tomographic images obtained by repeatedly photographing a region of interest of a subject under examination, display means coupled to the memory means, for displaying a tomographic image of the subject, and processing means for picking up pixel data on a corresponding line of the tomographic images and storing time-series image data on the corresponding line of the tomographic images, in one frame area of the memory means.

DETAILED DESCRIPTION OF THE PREFERRED EMBODIMENTS

Figure 1:
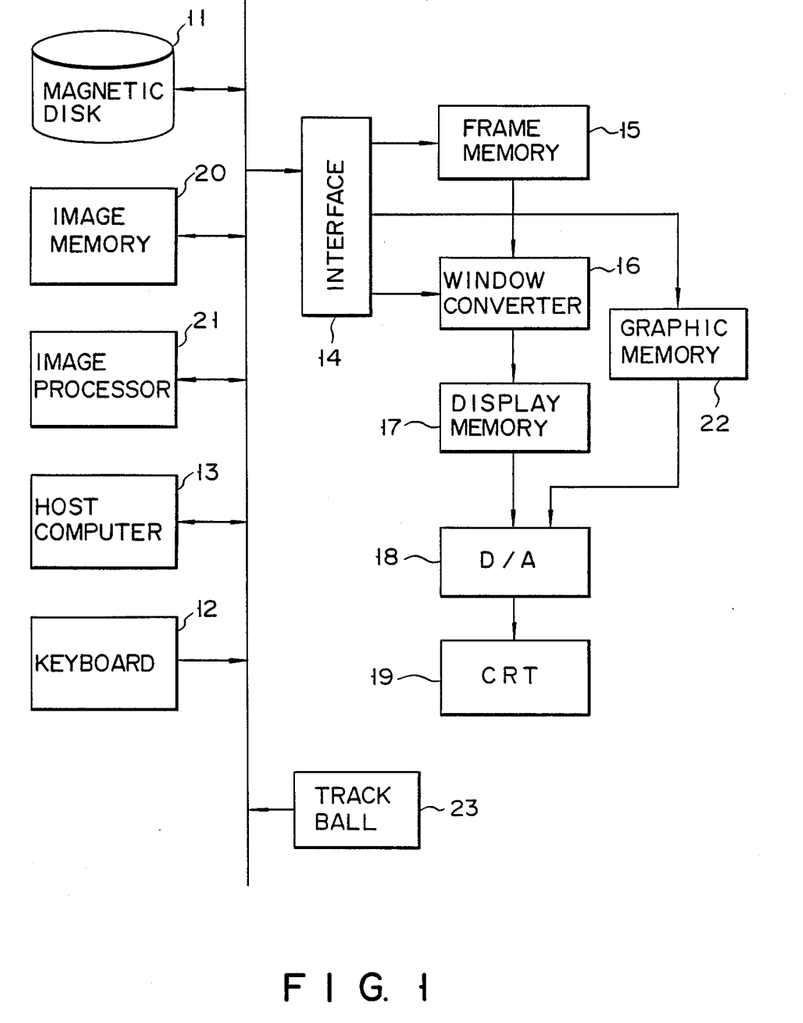
FIG. 1 is a block diagram of a X-ray CT scanner according to the invention.

Referring to FIG. 1, an X-ray CT apparatus according to the invention, comprises a magnetic disk unit 11 of large memory capacity, in which is stored a plurality of tomographic images D0, D1, ..., Dn, i.e., dynamic scan images, corresponding to photographing times t0, t1, ..., tn, obtained by repeatedly photographing a region of interest of a subject under examination, by use of an X-ray tube and an X-ray detector (neither being shown).

When, by way of keyboard 12, an operator instructs host computer 13 to display a tomographic image, host computer 13 reads out designated image data from magnetic disk 11 and writes it into frame memory 15 via interface 14. Frame memory 15 has a capacity sufficient to hold image data of one frame of the tomographic image. The image data has a depth of 12 bits per pixel. In other words, the CT value corresponding to an X-ray absorption coefficient has a graduation of $2^{12}$.

The image data read out from frame memory 15 is subjected to window conversion by window converter 16, whereby 12-bit image data is converted into 8-bit data. Window converter 16 consists of a RAM table, into which a conversion algorithm is written from host computer 13 via interface 14.

Figure 2:
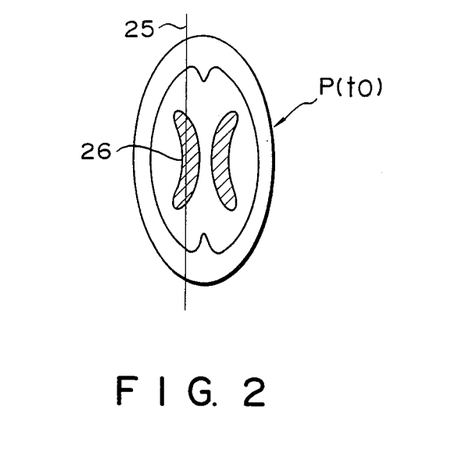
FIG. 2 shows one of a plurality of dynamic tomographic images obtained by repeatedly photographing a region of interest of a subject under examination.

The output data of window converter 16 is written into display memory 17. The image data read out from display memory 17 is converted by a digital-to-analog (D/A) converter 18 into an analog signal, which is supplied to CRT 19 for the display of one frame of tomographic image P as shown in FIG. 2. The addresses of display memory 17 are in one-to-one correspondence to the pixel positions on the screen of CRT 19. The CRT performs a raster scan as in a usual television receiver. When an address of display memory 17 is determined by suitable means (not shown) according to a raster position, image data stored in that address is read out and subjected to the D/A conversion process, to provide an analog signal corresponding to brightness of the CRT.

Figure 3:
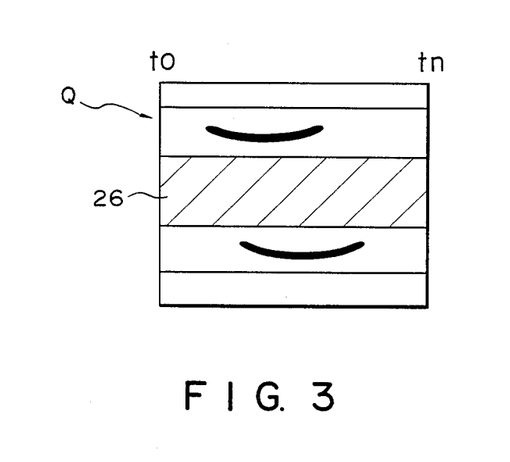
FIG. 3 shows a time-series image extracted from dynamic tomographic images for a part along a longitudinal line in FIG. 2.

A feature of the invention is to extract pixels along line 25 in FIG. 2 from all the tomographic images, expand the extracted pixels, in the order of photographing times t0, t1, ..., tn and display on CRT 19 a resultant time-series image Q of a region of interest along line 25, as is shown in FIG. 3. This permits changes over time, in a desired part of the tomographic image, i.e., organ 26, to be seen at a glance.

While one frame of tomographic image P, as shown in FIG. 2, is displayed on CRT 19, the operator instructs host computer 13 to display a time-series image of dynamic tomographic images. In response to this instruction, host computer 13 reads out data of all tomographic images D0, D1, ..., Dn corresponding to times t0, t1, ..., tn from magnetic disk 1 and writes these image data into image memory 20. Image memory 20 has a very large capacity. Subsequently, host computer 13 picks up image data of pixels along line 25 from tomographic data D0, D1, ..., Dn stored in image memory 20, and instructs generation of a time-series image, as shown in FIG. 3, to image processor 21. According to the pixel data extracted from image memory 20, image processor 21 produces an image, as shown in FIG. 3, and stores it in an area of image memory 20 other than the area where the tomographic images are stored. When image Q is stored in frame memory 15 in lieu of one frame of the tomographic image, the time-series image as shown in FIG. 3 is displayed on CRT 19.

According to this embodiment of the invention, image processor 21 reduces and rearranges tomographic image P and time-series image Q, to produce a new composite image S, and displays tomographic image P and time-series image Q simultaneously on the screen of CRT 19.

Host computer 13 draws a pattern corresponding to line 25, shown in FIG. 2, in graphic memory 22 via interface 14. Like display memory 17, the addresses of graphic memory 22 correspond to the pixels on the screen of CRT 19, and an address corresponding to a raster scan position on the CRT is accessed. The depth of each memory location of graphic memory 22 may be only one bit. When a bit read out from graphic memory 22 is "1", D/A converter 18 provides an analog signal at a maximum level, to make the screen of the CRT bright. The position of a line which is written first into graphic memory 22 may be suitably determined by host computer 13. When track ball 23 is operated by the operator, the movement thereof to the left or right hand side is input to host computer 13. The host computer accordingly causes movement of the bright line on the screen of CRT 19 to the left or right hand side. Then, host computer 13 instructs image processor 21 to generate time-series image Q corresponding to a new position of the bright line. The new image which is formed in this way is transferred from image memory 20 to frame memory 15, under the instruction of host computer 13. Thus, the operator can observe the time-series image at the new bright line position on the tomographic image.

Figure 4:
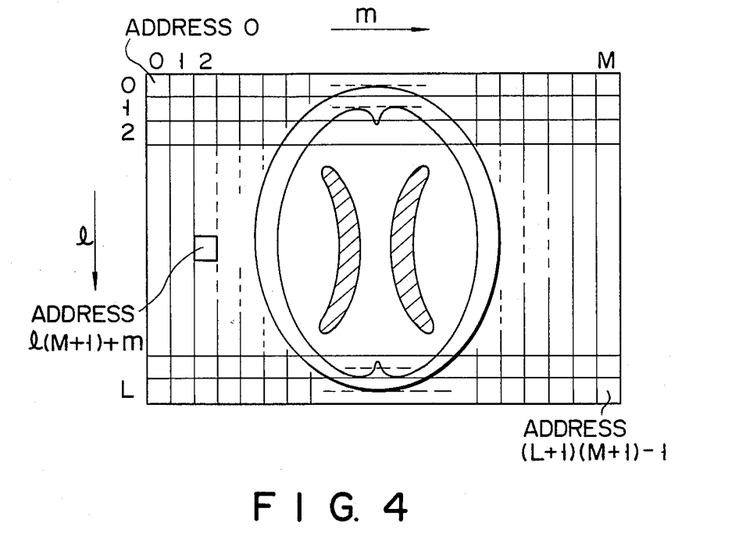
FIG. 4 is a diagram for explaining one frame area of an image memory where pixel data of a tomographic image is stored.

The relation between the pixels of one frame of image and the addresses of image memory 20 will now be described. For convenience of explanation, times t0 to tn of tomographic images D0 to Dn are expressed by frame numbers n=0, 1, ..., N. The position of a pixel in one frame of image, as shown in FIG. 4, is determined by a position m (0 to M) in the horizontal direction, and position l (0 to L) in the vertical direction. Where the address of the pixel at the left upper corner is 0, the address of a pixel at any given position is given by $l(M+1) + m$. Address A of a pixel in the n-th frame of tomographic image is given by $A = n(L+1)(M+1) + l(M+1) + m$.

M and L are both 511, for instance, and data P (n, l, m) of each pixel determined by n, l, m is stored in address A of image memory 20. Value D (A) read out from address A of image memory 20 is related as $$D(A) = D\{n(L+1)(M+1) + l(M+1) + m\} \equiv P(n, l, m)$$

The position of a pixel to be displayed on CRT 19 is also determined by l and m, as is shown in FIG. 4. Address B of frame memory 15 is expressed as $B = l(M+1) + m + K0$. Since the address space of frame memory 15 belongs to the same space as image memory 20, an address area spaced apart from the image memory address area by constant k0 is used for the frame memory.

Host computer 13 then instructs image processor 21 to pick up image data at given positions, e.g., pixel positions of $l = O$ to $L$, $m = (M-1)/4$ from each of images with frame numbers n = 0 to N stored in image memory 20 and produce new image Q. In consequence, image processor 21 performs an operation shown in a flow chart of FIG. 6. By this operation, image Q shown by the following equation is produced in an area subsequent to address K1 of image memory 20.

$$Q(l, m) = P(n, l, M - \tfrac{1}{4})$$

Figure 5:
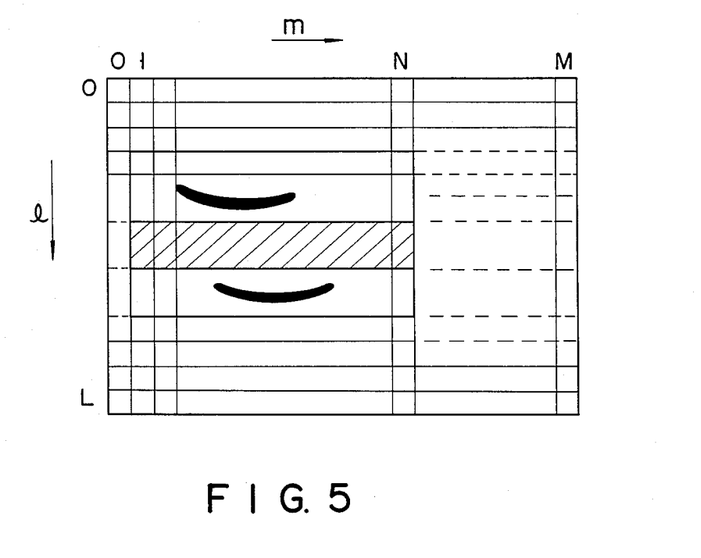
FIG. 5 is a diagram for explaining one frame area of an image memory where pixel data of a time-series image is stored.

Q (l, m) is a value of each pixel as shown in FIG. 5. In an area of m greater than N there is no corresponding image, so that "0"s are stored in this area.

The operation of image processor 21 will now be described, with reference to flow chart of FIG. 6. In steps S11 and S12, the processor sets parameters n and l to 0. Then, in step S13 the processor outputs address data $A = n(L+1)(M+1) + l(M+1) + (M-1)/4$ to an address line. In subsequent step S14, processor 21 reads out image data D(A) designated by A from image memory 20. In subsequent step S15 the processor computes address data $A' = K1 + l(M+1) + n$ and outputs it to the address line. In this case, K1≠K0. In subsequent step S16, the processor writes data D(A) into address A' of image memory 20. In a subsequent step S17, the processor increments parameter l by 1. In subsequent step S18, the processor compares l to L. Steps S13 to S18 are executed repeatedly until l is equal to L.

When l becomes equal to L, step S19 is executed, in which the processor increments parameter n by 1. In subsequent step S20, the processor compares n to N (the number of stored tomographic images). If n<N, steps S12 to S20 are executed repeatedly until n = N. By the above operations, image data of pixels at corresponding positions of all the tomographic images is stored in an area following address K1 of the image memory. In consequence, time-series image Q is produced in the image memory.

If it is determined in step S20 that n=N, steps S21 and S22 are executed to set l and n to 0 and N+1, respectively. In subsequent step S23, the processor computes $A' = K1 + l(M+1) + n$ and outputs it to the address line. In subsequent step S24, the processor writes "0" into address designated by A'. In subsequent step S25, the processor increments n by 1. In subsequent step S26, the processor compares n and M. If n<M, the processor repeatedly executes steps S23 to S26. By these operations, "0"s are stored in areas of $m = N+1$ to M as shown in FIG. 5. If it is determined in step S26 that n=M, the processor increments l by 1 in step S27. In step S28, the processor compares l and L. If l<L, the processor repeatedly executes steps S22 to S28. In these operations, "0"s are stored in areas of $m=N+1$ to $M$, $l=0$ to $L$ shown in FIG. 5.

Figure 6:
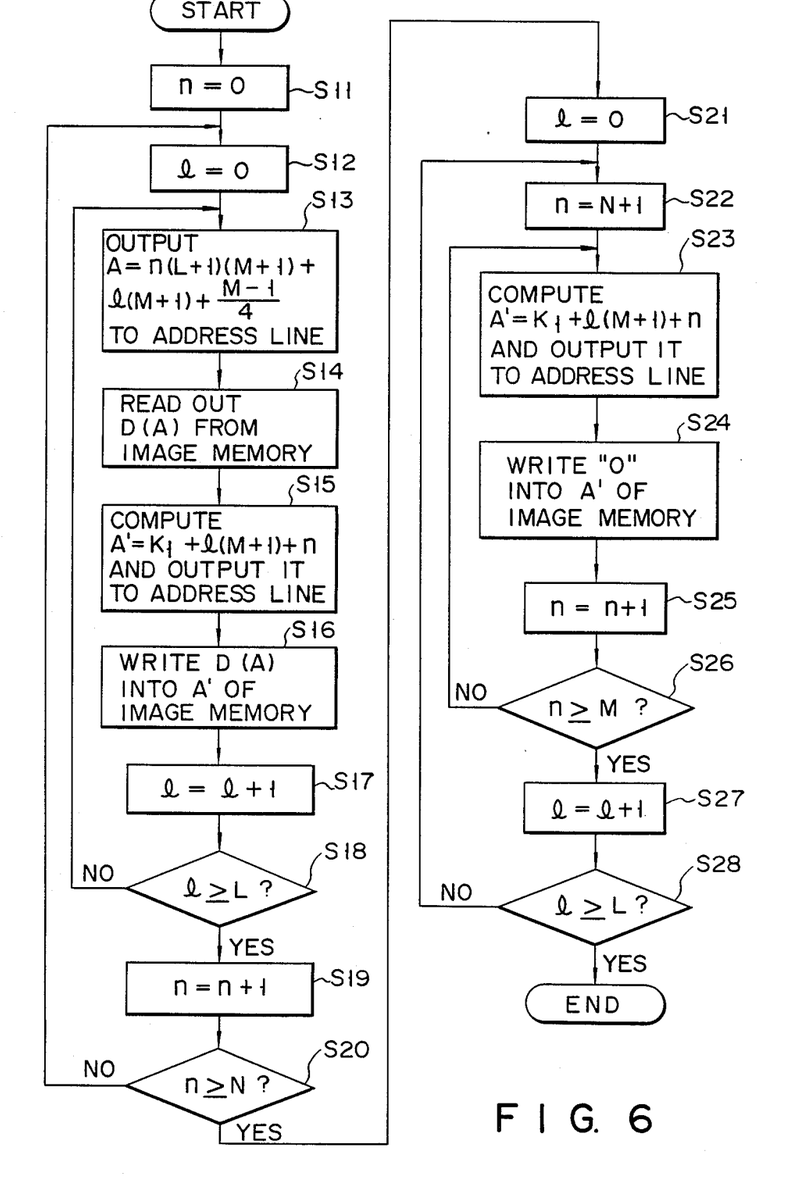
FIG. 6 is a flow chart illustrating a process for producing, from a plurality of tomographic images, a time-series image in one frame area of the image memory as shown in FIG. 5.

As shown above, by the operations of image processor 21 shown in the flow chart of FIG. 6, time sequence image Q as shown in FIG. 3 is produced in areas of image memory 20 subsequent to address K1.

Figure 7:
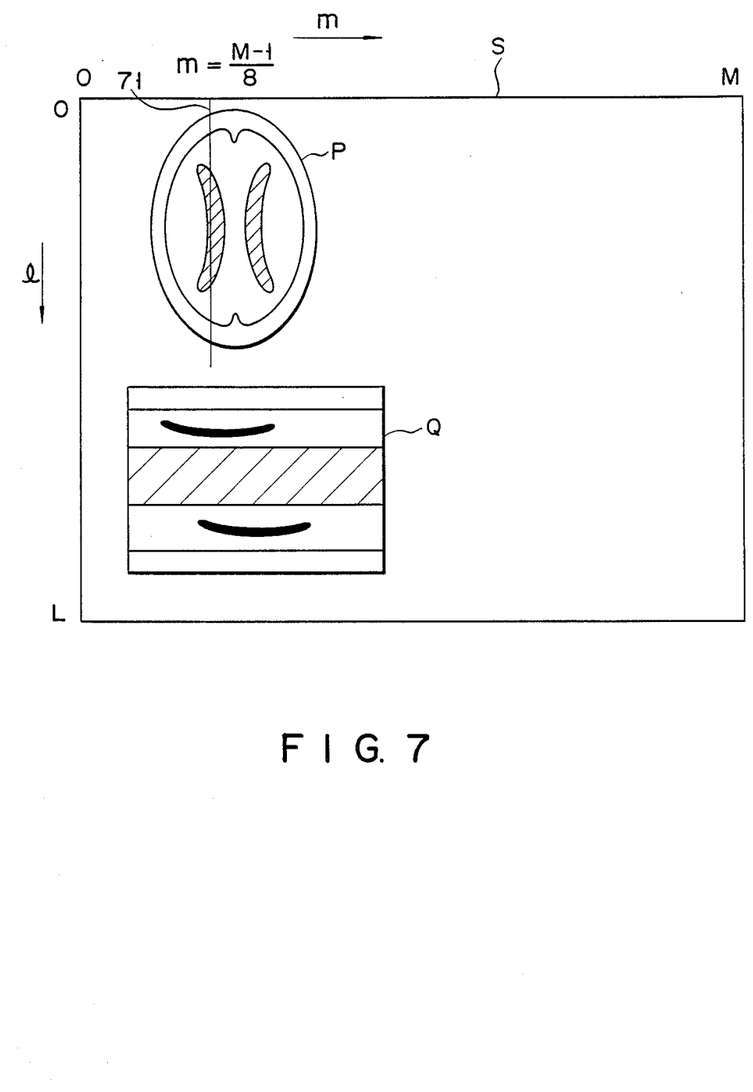
FIG. 7 shows a composite image where a tomographic image and a time-series image are presented in a reduced scale.

Subsequently, for displaying tomographic image P shown in FIG. 2 and time sequence image Q shown in FIG. 3 simultaneously on the screen of CRT 19, host computer 13 and image processor 21 perform reduction and rearrangement of both the images to produce composite image S as shown in FIG. 7 in image memory 20. In the example shown in FIG. 7, tomographic image P is arranged in an area in a left upper half of one frame, while time sequence image Q is arranged in an area on the left lower half.

The reduction and rearrangement of both the images are effected by the following operations.

If first displayed tomographic image P shown in FIG. 2 is a dynamic image of $n=0$, this dynamic image data is stored in addresses $A=0$ to $(L+1)(M+1)-1$ of image memory 20. The time sequence image of FIG. 3 is stored in addresses $A=K1$ to $K1+(L+1)(M+1)-1$ of image memory 20.

Figure 8A:
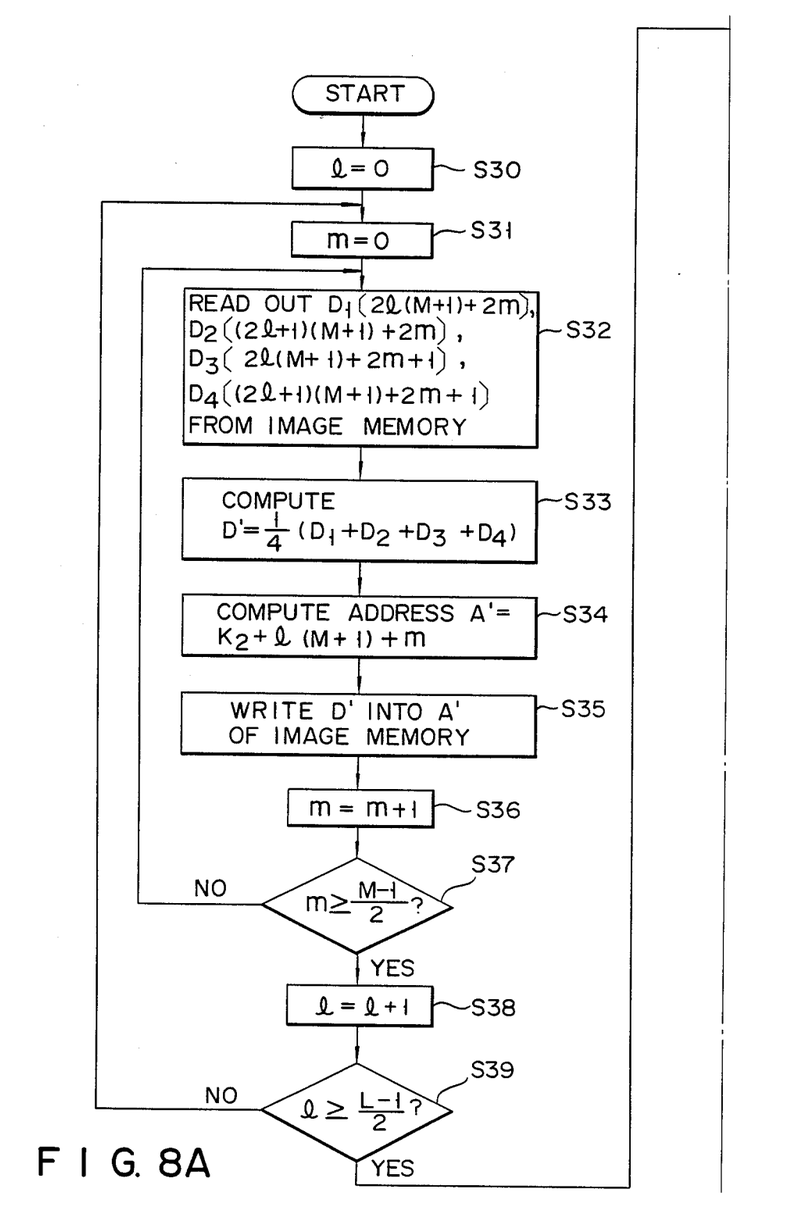
FIGS. 8A and 8B is a flow chart illustrating a process for producing the composite image shown in FIG. 7.
Figure 8B:
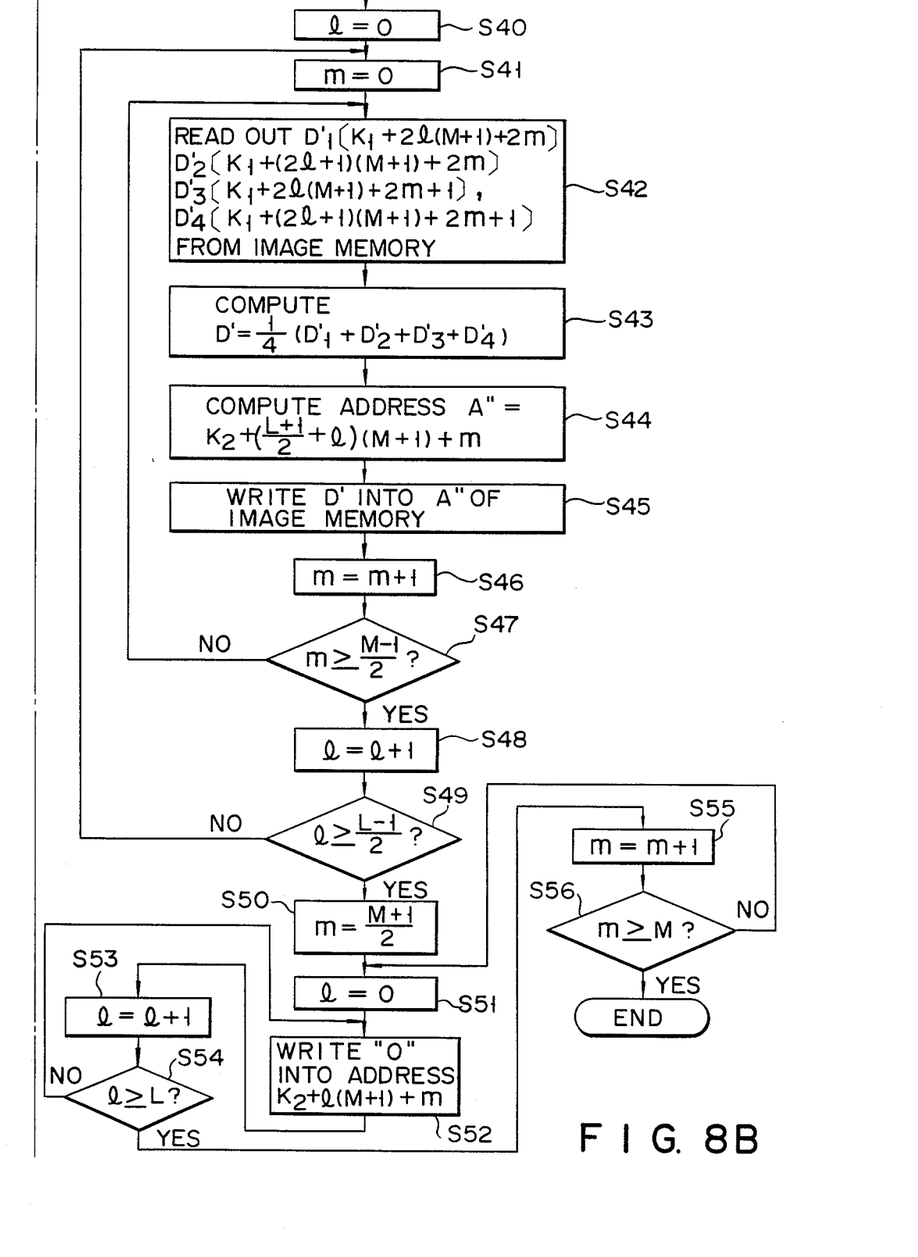

Based on these images image processor 20 produces a composite image as shown in FIG. 7 according to a process shown in the flow chart of FIGS. 8A and 8B. The first loop of this flow chart represents a process of reducing image P by one half in length (i.e., one forth in area) and arranging the reduced image on one fourth area in the left upper part of image S. The next loop represents a process of reducing image Q by one half in length and arranges the reduced image in a one fourth area in a left lower part of image S. The last loop is a process of setting "0"s in one half area in right part of image S. By these processes, composite image S shown in FIG. 7 is stored in addresses K2 to $K2+(L+1)(M+1)-1$ of image memory 20. When host computer 13 transfers pixel data of image S to frame memory 15, composite image S will be displayed. At this time, vertical line 25 shown in FIG. 2 is not displayed.

In the flow chart of FIGS. 8A and 8B, parameters l and m are set to 0 in respective steps S30 and S31. To access image P of $n=0$, image processor 21 computes addresses $2l(M+1)+2m$, $(2l+1)(M+1)+2m$, $2l(M+1)+2m+1$ and $(2l+1)(M+1)+2m+1$ and reads data D1 to D4 from these addresses of image memory (step S32). In subsequent step S33, the image processor computes $D'=\frac{1}{4}(D1+D2+D3+D4)$. By these operations, the average value of data of 4 pixels adjacent to one another in tomographic image P of $n=0$ are obtained.

In subsequent step S34, the image processor computes address $A'=K2+l(M+1)+m$, and in step S35 it writes D' into address A' of image memory 20. In consequence, the area of 4-pixel size is reduced to one half in length.

In subsequent step S36, m is incremented by 1, and in subsequent step S37 m is compared to $(M-1)/2$. If $m<(M-1)/2$, steps S31 to S37 are repeatedly executed. In this way, the length of image P is reduced to one half in the m-direction.

If it is determined in step S37 that $m=(M-1)/2$, l is incremented by 1. In step S39, l is compared to $(L-1)/2$. If $l<(L-1)/2$, steps S31 to S39 are repeatedly executed. In consequence, image P is reduced to one half in length, and the average value for four pixels is stored in pixel areas $l=K2$ to $K2+(L-1)$ and $m=K2$ to $K2+(M-1)/2$ in the image memory.

If it is determined that $l=(L-1)/2$, the routine proceeds to steps S40 and S41 (FIG. 8B) for setting l and m to 0. In step S42, the image processor computes addresses $K1+2l(M+1)+2m$, $K1+(2l+1)(M+1)+2m$, $K1+2l(M+1)+2m+1$ and $K1+(2l+1)(M+1)+2m+1$ of the image memory where data of time sequence image Q is stored and reads out image data D'1 to D'4 from these image memory addresses. In subsequent step S44, the average value D' of these image data is computed. In step S44, the processor computes address $A''=K2+\{(L+1)/2+l\}(M+1)+m$ of the image memory, in which the reduced image of 4-pixel time sequence image Q is to be stored. In step S45, the average value D' of 4-pixel data is stored in address A''.

In subsequent step S46, m is incremented by 1. In subsequent step S47, m is compared to $(M-1)/2$. If $m<(M-1)/2$, steps S42 to S47 are repeatedly executed. This operation is similar to the operation of steps S32 to S37. If it is determined that $m=(M-1)/2$, is incremented by 1 in step S48. In step S49, l is compared to $(L-1)/2$. If $l<(L-1)/2$, steps S41 to S49 are executed repeatedly until $l=(L-1)/2$. In consequence, image data of reduced time sequence image Q is written in areas $l=(L+1)/2$ to L and $m=0$ to $(M-1)/2$ of the image memory. If it is determined that $l=(L-1)/2$, m and l are respectively set to $(M+1)/2$ and 0 in respective steps S50 and S51. In subsequent step S52, address $A=K2+l(M+1)+m$ is computed, and "0" is written in this address. In subsequent step S53, l is incremented by 1. In subsequent step S54, l is compared to L. If $l<L$, steps S53 to S54 are repeatedly executed. If it is determined that $l=L$, m is incremented by 1 in step S55, and m is compared to M in step S56. If $m<M$, steps S51 to S56 are executed repeatedly until $m=M$. In this operation, "0"s are written in image memory areas $l=K2$ to $K2+L$, $m=(M+1)/2$ to M. In this way, image data representing composite image S as shown in FIG. 7 is stored in the image memory. The host computer transfers this image data to frame memory 15, whereby composite image S as shown in FIG. 7 is displayed on CRT 19. At this instant, bright line 71 has not yet been displayed on tomographic image P.

Then, the host computer writes the pattern of a bright line at a given position in graphic memory 22 via interface 14. More specifically, the host computer writes "1"s into addresses $m=mx$ (a given fixed value), $l=0$ to $(L-1)/2$. In the case of this embodiment, time sequence image Q at $m=(M-1)/4$ of tomographic image P is understood from the description concerning FIG. 6, so that the host computer writes the pattern of a bright line at position $mx=(M-1)/8$. The image shown in FIG. 7 is time sequence image Q at position $mx=(M-1)/8$ of bright line 71 of image P.

Then, the operator operates track ball 32. The movement of track ball to the left or right is input to host computer 13. If the track ball has been operated to the right, the host computer adds a suitable increment to mx, for instance, $mx=(M-1)/8+1$. The host computer erases bright line 71 at $mx=(M-1)/8$ from image S of FIG. 7. That is, host computer 13 renders zero data at addresses $m=(M-1)/8, l=0$ to $(L-1)/2$ of graphic memory 22. Then, host computer 13 writes "1"s in addresses $m=(M-1)/8+1, l=0$ to $(L-1)/2$ of graphic memory 22. In consequence, the bright line is moved to the right by one pixel.

Subsequently, host computer 13 instructs image processor 21 for the generation of new image S corresponding to a new bright line position.

Image processor 21 produces new image Q in an area subsequent to address K1 of image memory 20 according to a new program, in which $(M-1)/4+2$ is used in lieu of $(M-1)/4$ contained in address data A of step Sl3 in FIG. 6.

The reason for using $(M-1)/4+2$ in lieu of $(M-1)/4$ is that the movement of the bright line in the image reduced to one half in length for one pixel corresponds to the movement for two pixels in image Q which is not reduced.

Subsequently, host computer 13 reduces the length of newly produced image Q to one half in steps S40 to S49 in FIG. 8 and re-writes areas of addresses $1=(L+1)/2$ to L, $m=0$ to $(M-1)/2$ of image memory 20. New image S is transferred from image memory 20 to frame memory 15 in accordance with an instruction from the host computer. In consequence, the operator can observe, along with the movement of bright line 71 on tomographic image P, new time sequence image Q corresponding to the new position of bright line 71.

The operation of the X-ray CT apparatus according to the invention as described above is summarized in the flow chart of FIG. 9.

Figure 9:
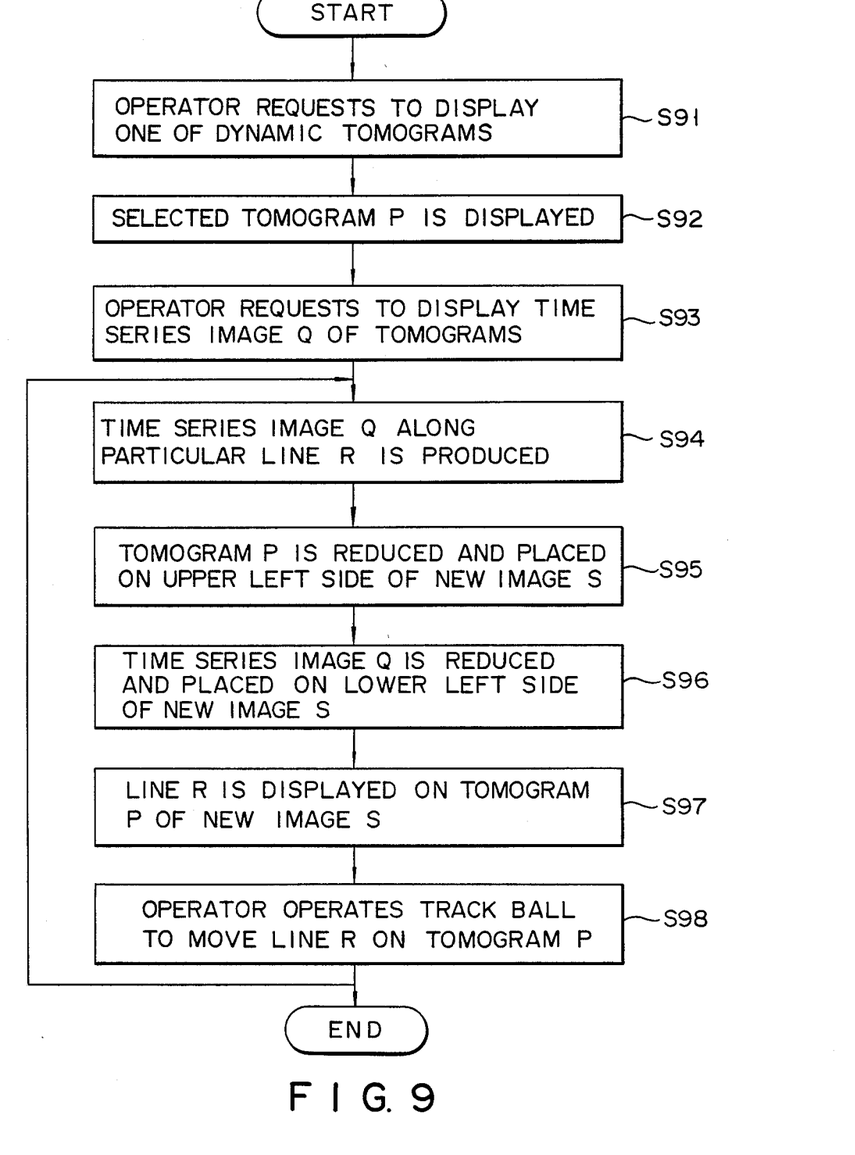
FIG. 9 is a flow chart illustrating the over-all operation of the X-ray CT apparatus according to the invention.

First, in step S91 the operator requests host computer 13 to display of one a plurality of dynamic tomographic images stored on magnetic disk 11 on CRT 19. Tomographic image P selected in step S91 is displayed in step S92. In subsequent step S93, the operator demands display of time sequence image Q of tomographic images. In subsequent step S94 host computer 12 produces time sequence image Q of tomographic images along particular line R in image memory 20. In step S95, tomographic image is reduced and arranged on left upper part of new image S in the image memory. Likewise, in step S96 time sequence image Q is reduced and arranged on left lower part of new image S. In step S97, bright line R is displayed on tomographic image P of composite image S displayed on CRT 19. In step S98, the operator operates, if necessary, the track ball to move the bright line on tomographic image P to the left or right. When bright line R is moved, time sequence image Q at new bright line position is produced to be displayed in lieu of the old time sequence image of composite image S.

In the embodiment shown in FIG. 1, frame memory 15 is provided separately of image memory 20. In a modification, it is possible to use part of the image memory as frame memory.

What is claimed is:

1. A X-ray computerized tomograpy apparatus comprising:
    memory means having a plurality of frame storage areas for storing, in each of said frame storage areas, pixel data of one frame of a plurality of tomographic images of a region of interest of a subject under examination, which have been obtained by repeatedly photographing said region of interest of said subject at successive photographing times;
    display means coupled to said memory means, for displaying a frame of said plurality of tomographic images; and
    processing means coupled to said memory means, for picking up data of pixels arranged on a corresponding line of said tomographic images from data of all pixels of said tomographic images, and storing the picked-up data of said pixels on the corresponding line of said tomographic images, in the order of photographing times of said tomographic images, in a predetermined frame storage area of said memory means, to provide a time series image formed of said pixels on said corresponding line of said tomographic images.

2. An apparatus according to claim 1, further comprising
    means for displaying a bright line corresponding to said corresponding line of said tomographic images, on said display means.

3. An apparatus according to claim 2, further comprising
    means for moving said bright line to the left or ring hand side of said display means.

4. An apparatus according to claim 1, said processing means further comprising means for two-dimensionally arranging the data of said pixels on the corresponding line of said tomographic images stored in said frame storage area of said memory means, to provide the time series image.

5. An apparatus according to claim 4, further comprising means for displayng a bright line corresponding to said corresponding line of said tomographic images, on said display means.

6. An X-ray computerized tomography apparatus comprising:
    memory means having a plurality of frame storage areas for storing, in each of said frame storage areas, pixel data of one frame of a plurality of tomographic images of a region of interest of a subject under examination, which have been obtained by repeatedly photographing said region of interest of said subject;
    display means coupled to said memory means, for displaying a frame of said plurality of tomographic images;
    processing means coupled to said memory means, for picking up data of pixels arranged on a corresponding line of said tomographic images from data of all pixels of said tomographic images, and storing the picked-up data of said pixels on the corresponding line of said tomographic images, in the order of photographing times of said tomographic images, in a predetermined frame storage area of said memory means, to provide a time series image formed of said pixels on said corresponding line of said tomographic images, said processing means reducing one of said tomographic images and said time series image, and rearranging said reduced tomographic image and said reduced time series image in one frame storage area of said memory means, to simultaneously display said reduced tomographic image and said reduced time series image on said display means;
    means for displaying a bright line representing a corresponding line of said tomographic images, on said reduced tomographic image displayed on said display means; and
    means for moving said bright line on said display means; and wherein
    said processing means provides a new time series image formed of pixels corresponding to a new position of said bright line on said reduced tomographic image, reduces said new time series image, and replaces data of said reduced time series image stored in said memory means with data of said new reduced time series image.

7. An x-ray computerized tomography apparatus comprising:
- memory means having a plurality of frame storage areas for storing, in each of said frame storage areas, pixel data of one frame of a plurality of tomographic images of a region of interest of a subject under examination, which have been obtained by repeatedly photographing said region of interest of said subject at successive photographing times;
- display means coupled to said memory means, for displaying a frame of said plurality of tomographic images; and
- processing means couple to said memory means, for picking up data of pixels arranged on a corresponding line of said tomographic images from data of all pixels of said tomographic images, and storing the picked-up data of said pixels on the corresponding line of said tomographic images, in the order of photographing times of said tomographic images, in a predetermined frame storage area of said memory means, to provide a time series image formed of said pixels on said corresponding line of said tomographic images, and
- wherein said processing means reduces one of said tomographic images, and said time series image, and rearranges said reduced tomographic image and said reduced time series image in one frame storage area of said memory means, to simultaneously display said reduced tomographic image and said reduced time series image on said display means.

* * * * *

UNITED STATES PATENT AND TRADEMARK OFFICE
CERTIFICATE OF CORRECTION

PATENT NO. : 4,858,129

DATED : August 15, 1989

INVENTOR(S) : Issei Mori

It is certified that error appears in the above-identified patent and that said Letters Patent is hereby corrected as shown below:

Claim 3, column 8, line 15, change "ring" to --right--.

Signed and Sealed this

Seventeenth Day of March, 1992

Attest:

HARRY F. MANBECK, JR.

*Attesting Officer*   *Commissioner of Patents and Trademarks*